United States Patent [19]

Nayar

[11] Patent Number: 4,748,738
[45] Date of Patent: Jun. 7, 1988

[54] HIGH STRENGTH MAGNET-POLE PIECE ASSEMBLY TOOL

[75] Inventor: Sham S. Nayar, Eagan, Minn.

[73] Assignee: Magnetic Peripherals Inc., Minneapolis, Minn.

[21] Appl. No.: 75,927

[22] Filed: Jul. 21, 1987

[51] Int. Cl.⁴ .................... H02K 15/02; H01F 7/06
[52] U.S. Cl. ............................. 29/732; 29/596; 29/607; 29/744
[58] Field of Search .............. 29/596, 602 R, 607, 29/732, 744

[56] References Cited

U.S. PATENT DOCUMENTS

| | | | |
|---|---|---|---|
| 3,986,252 | 10/1976 | Brunschwig | 29/596 |
| 4,126,933 | 11/1978 | Anderson et al. | 29/598 |
| 4,443,934 | 4/1984 | Hickey | 29/593 |
| 4,586,244 | 5/1986 | Muller | 29/598 |
| 4,608,752 | 9/1986 | Muller | 29/598 |
| 4,644,640 | 2/1987 | Muller | 29/596 |

Primary Examiner—Carl E. Hall
Attorney, Agent, or Firm—Edward Schwarz; Joseph A. Genovese

[57] ABSTRACT

Apparatus for assembling a pair of high strength magnets and the common pole piece into a unit for use in a disk drive includes a bed with a channel in which the magnets can slide or translate, and a stop centrally located in the channel to prevent execessive impact between the magnets as they slide under the force of mutual attraction toward each other. A recess in the bottom of the channel below the stop is adapted to receive the pole piece, and the attractive force between the pole piece and the magnets firmly attaches the magnets to the pole piece in the desired location after they have been properly positioned with respect to the pole piece by interaction of the stop and channel walls with the magnets. After the magnets have attached themselves to the pole piece, the assembly can be handled without shifting the magnets on the pole piece to allow further manufacturing processes, say baking in an oven where glue on the surface of the magnets or pole piece can be melted to mechanically bond the assembly together.

9 Claims, 3 Drawing Sheets

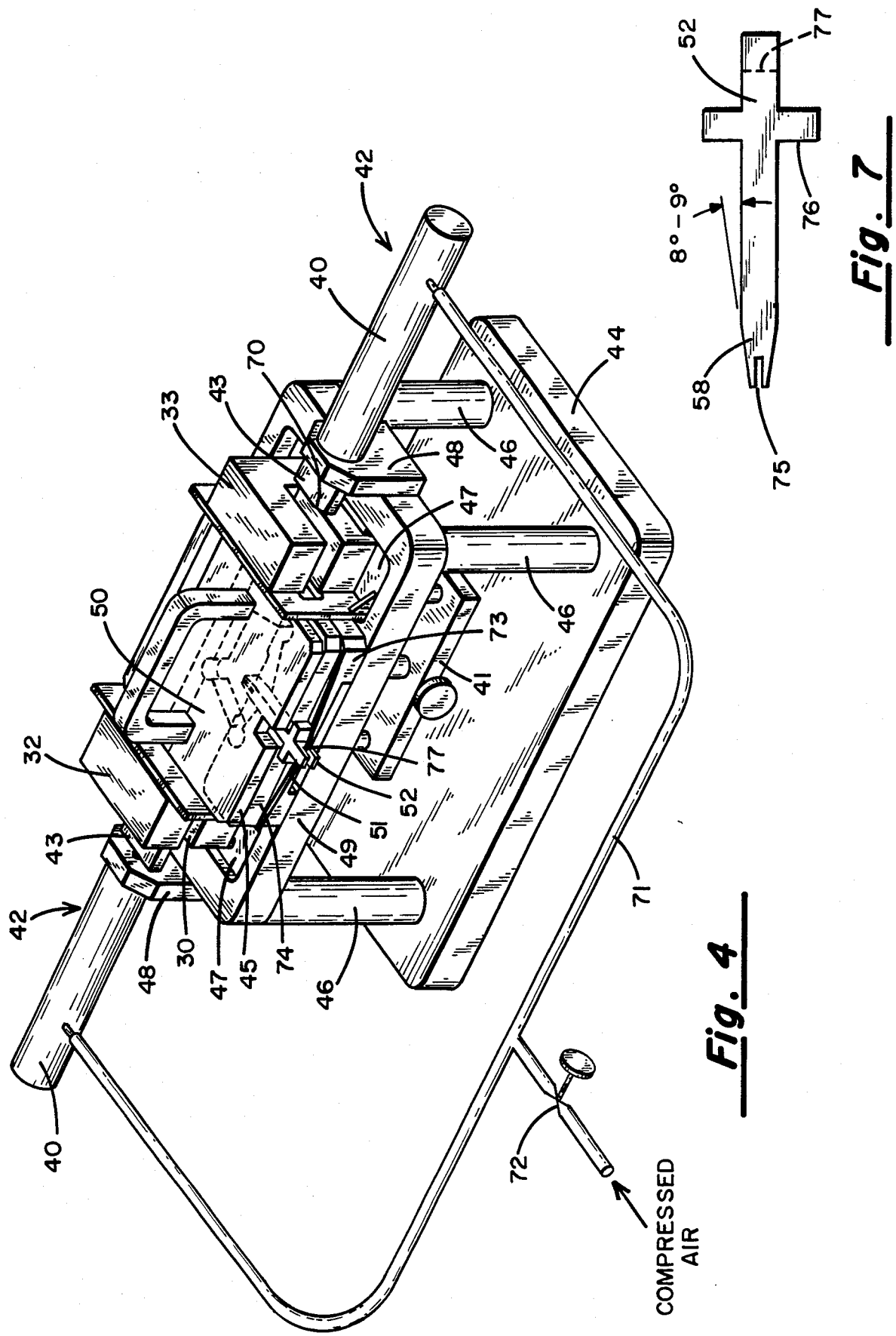

HIGH STRENGTH MAGNET-POLE PIECE ASSEMBLY TOOL

BACKGROUND/INFORMATION DISCLOSURE STATEMENT

It is now the usual case that the small transducers on disk memory units employing rigid disks are carried by an arm which is rotatably mounted to the deck which holds the disk spindle itself. The arm is positioned by a powerful permanent magnet motor which rotates the arm to position the transducer on the disk at the desired radius. The motors are typically designed with extremely high torque so that actuation, i.e. movement from one radius to another, of the arm occurs as quickly as possible.

High torque requires high strength magnets. The magnets are usually made from a boron rare earth metal (such as samarium or neodymium) alloy and have extremely high flux generating capability. When fully magnetized, they are so powerful that a normal person cannot manually restrain the magnets from slamming onto the pole piece which mechanically supports them, or into each other, with such force that the magnet itself is shattered by the impact, causing pieces to fly dangerously around the area and damage the magnet beyond use. And if a person is unlucky enough to get a finger between such a magnet and any ferrous object, serious injury is possible.

In one particular actuator motor design, a pair of such magnets are coated with a thermosetting glue and then mounted in required, spaced-apart positions, on a common surface of a pole piece. The magnetic attraction between the magnets and the pole piece allows the magnet-pole piece assembly to be transported without shifting of the magnets on the pole piece to an oven for baking to mechanically bond the magnets to the pole piece.

Two magnet pairs are used to define between them a flux carrying gap in which the coil of the actuator motor moves in response to current passed through it. The coil is attached to the transducer arm, and in this way the arm is rotated to place the transducers at the desired radius.

A serious problem, alluded to above, is how one attaches and properly positions the magnets on the pole pieces without risking one's limbs or damaging the magnets. Once they have attached themselves to the pole piece, if they are not positioned properly, it is remarkably difficult to reposition them before baking. While repositioning can be done manually, or even with a tool, when thousands of these assemblies are needed for a production run, it is simplest to assure that the magnets are attached accurately at the very beginning.

There appears to be very little in the literature which addresses these problems. There are a number of patents which deal with various aspects of assembling conventional rotary electric motors. Among these, roughly in the order of their relevance, are U.S. Pat. Nos. 4,586,244; 4,608,752; 4,644,640; 4,126,933; and 4,443,934.

BRIEF DESCRIPTION OF THE INVENTION

My apparatus for positioning the magnets on the pole piece takes advantage of the fact that each of the magnets used in the actuator design discussed above have two pairs of exterior corners, each pair of which defines a line intersecting them. The two lines so defined are approximately parallel to each other with a predetermined spacing from each other.

The positioning apparatus includes a non-magnetic bed having a channel formed of a pair of opposed and facing interior walls and a floor between the walls. The walls are spaced from each other a distance slightly greater than the spacing between the magnets' pair of parallel lines so as to allow each magnet to slide within the channel with each pair of corners defining one of the lines adjacent an interior wall, and permitting only a predetermined rotation of a magnet within the channel. There is a recess adapted to receive the pole piece, centrally located in the channel floor with the surface of the pole piece on which the magnets are to be positioned approximately flush with the channel floor. The recess is positioned to receive the pole piece so as to create the predetermined spatial relationship between each magnet and the pole piece as the magnets slide toward each other in the channel and over the pole piece.

The magnets are initially positioned at the channel ends, preferrably in keepers, so that there is no likelihood that the magnets will be prematurely attracted toward each other. A magnet pusher at each end of the channel simultaneously slides the magnets placed at the ends of the channel toward each other until mutual magnetic attraction between them pulls them toward each other. A stop is located in the channel above the pole piece recess at least partially closing the channel. The mutual magnetic attraction pulls the magnets into contact with the stop at a point where interaction between the magnets and the stop and channel wall causes the magnets to rotationally and translationally position themselves on the pole piece in the predetermined spatial relationship. The force of the magnetic attraction between the magnets and the pole piece serves to maintain the magnets in the predetermined spatial relationship on the pole piece. The stop cushions the impact between the magnets so that no damage occurs to the parts involved.

It is preferred that the stop comprise a member protruding into the channel above and approximately centered on the recess which receives the pole piece. In a preferred embodiment the member is slidably mounted in the bed with a tip within the channel. The member's tip has a bevel facing each end of the channel. A spring urges the member into the channel. When the magnet strikes the bevel, it creates a camming action which forces the member's tip out of the channel allowing the magnets to further shift under their mutual attraction force into their preferred position on the pole piece. The camming of the member's tip serves to decelerate the magnets at a rate slow enough to prevent harm to them.

It is convenient to use a ferrous keeper for the magnet in which the magnet is magnetized, thereby avoiding the necessity of handling the magnet by itself.

It is preferred that a cover be placed on the channel so that when the magnets position themselves, there is no possibility of them jumping out of the channel and possibly causing injury to a worker or damaging themselves.

Accordingly, one purpose of this invention is to allow an assembly comprising high strength magnets and a pole piece to be assembled without causing damage to the parts involved or to the operator.

A second purpose of the invention is to allow such an assembly to be consistently assembled with the magnets correctly positioned on the pole piece.

Yet another purpose is to allow untrained manufacturing personnel to assemble the magnet assembly.

A further purpose is to allow both magnets of such a dual magnet assembly to be simultaneously positioned on the pole piece, thereby speeding the assembly process.

BRIEF DESCRIPTION OF THE DRAWINGS

FIG. 4 is a perspective drawing of the apparatus which is used to position the magnets on pole piece which carries the magnets in the disk drive actuator.

FIG. 7 is a plan view of the magnet stop seen in FIGS. 4–6.

DESCRIPTION OF THE PREFERRED EMBODIMENT

Figure 1:
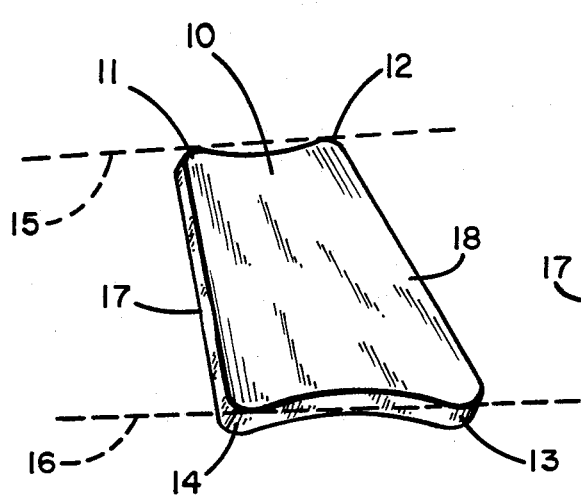
FIG. 1 is a perspective drawing of a magnet of the type to be included in a magnet assembly for the actuator of a disk drive.

In FIG. 1 the magnet 10 shown therein can be seen to have a block form with a pair of substantially flat sides 17 (of which only an edge is shown) and 18, thereby defining a uniform thickness of the block. Magnet 10 has a first pair of exterior corners 11, 12 defining a line 15 intersecting or mutually tangent to corners 11, 12, and a second pair of corners 13, 14 having a second line 16 intersecting or mutually tangent to corners 13, 14. Lines 15 and 16 are approximately parallel to each other in the plane of either side of magnet 10. The magnetization is oriented such that the two flat surfaces 17 (only an edge of which is shown) and 18 comprise the poles.

Magnet 10 may be made of any high flux generating, high remanence magnetic material. One preferred material, formed into the desired shape by sintering, is a recently developed compound comprising approximately 27% neodymium, 1% boron, and 72% iron, all by weight. Should such material be formed into a magnet 10 such as is shown in FIG. 1 comprising a block approximately 0.25 in. (1 cm.) thick with each side 17, 18 having an area of approximtely 1.8 sq. in., its attractive force when the flux path is efficiently closed is upwards of 70 lbs. (30 kg.) on a flat steel surface. Such a magnet can generate 35 kilolines per sq. in. or more of magnetic flux. Accordingly, it can be seen that these magnets are definitely not toys, and can easily do substantial damage to any surface to which they are attracted, unless restrained. Any human body part such as a finger, which is caught between such a magnet and a metal surface to which it is attracted can be severely injured if the magnet 10 is not restrained.

Figure 2:
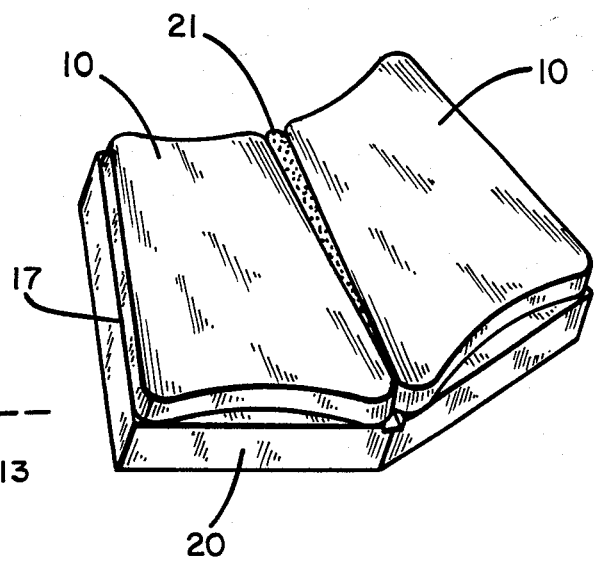
FIG. 2 is a perspective drawing of the magnet assembly referred to in the description of FIG. 1.

FIG. 2 shows two of the magnets 10 of FIG. 1 in a preferred position on a pole piece 20 for use in a particular type of disk drive actuator. Side 17, shown only on edge, has a coating of a thermosetting glue by which the magnets 10 are permanently attached to the pole piece 20. A thin coating of the glue is placed on sides 17 and 18 before the magnets 10 are positioned on the pole piece 20, and the attractive force of the magnets 10 is more than sufficient to hold them in proper positions on pole piece 20 given reasonably careful handling. After the magnets 10 have been positioned on pole piece 20, the assembly is baked to set the glue and mechanically attach the magnets 10 to the pole piece 20. A spacer 21 aids in defining the preferred position of magnets 10 on pole piece 20.

As mentioned above, the magnets 10 are magnetized so that sides 17 and 18 are the poles. They are oriented magnetically on pole piece 20 so that the flat side 17 or 18 of one magnet 10 on pole piece 20 having a north pole is coplanar with a side of the other magnet having a south pole. Therefore, there is mutual magnetic attraction between the two magnets 10 carried on pole piece 20 when assembled correctly. More to the point for the operation of the invention to be described, these magnets have mutual attraction for each other when still several centimeters apart because of the needed magnetic orientation with respect to each other.

Figure 3A:
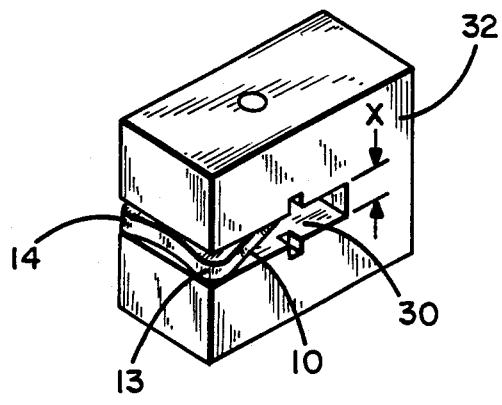
FIGS. 3a and 3b is a perspective drawing showing respectively left and right keepers in which magnets of the type depicted in FIG. 1 are transported during manufacturing processes.
Figure 3B:
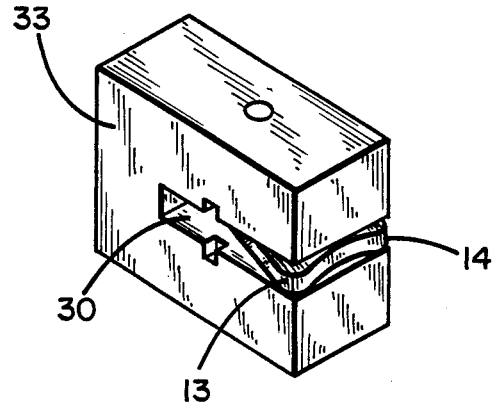

As mentioned earlier, handling these magnets requires great caution. Accordingly, is is preferred to carry them after they have been magnetized in the keepers 32, 33 shown in FIGS. 3a and 3b respectively until they have been positioned on the pole piece 20. Keepers 32, 33 are made of a magnetically soft iron to which the magnets 10 are strongly attracted. Each keeper 32, 33 has a slot 30 slightly wider that the thickness of the magnets 10 and which cuts entirely through keepers 32, 33 so as to intersect three sides thereof as shown. Slots 30 are of a size allowing the magnets 10 to be positioned within them in a preferred spatial orientation shown with the second pair of corners 13, 14 near the outside of the slot 30, and the first pair of corners 11, 12 adjacent the bottom of the slot. The magnets 10 are positioned in their keepers 32, 33 before they are magnetized, and are magnetized in the keepers. After magnetization, the keepers conduct most of the flux from magnets 10 through themselves and prevent these magnets from attracting themselves unexpectedly to ferrous surfaces. At the same time, the magnetic attraction between the keepers and their magnets is so strong that the magnets will typically not shift within the slot. This is a useful characteristic, since the orientation of the magnet 10 is important when attaching it to pole piece 20, and if the orientation of magnet 10 is not easily changed in its keeper, a predetermined position of the keeper predetermines the position of the magnet as well.

The apparatus of FIG. 4 is used for correctly positioning a pair of magnets 10 on a pole piece 20 without running the risk of damage to the parts or harm to anyone. The preferred embodiment comprises a sub-base 44 carrying four posts 46 on which the remainder of the device is supported. A base 49 is supported on the ends of posts 46 in spaced apart relationship with sub-base 44. The base has a channel in which the actual attachment of the magnets 10 to a pole piece 20 occurs.

Two brackets 48 are attached to opposite sides of base 49, which brackets support a pair of compressed air driven magnet pushers, generally 42, each of which have a cylinder-piston unit 40 and a non-magnetic anvil 43 at the operating end of the piston. Each anvil 43 has a small bevel 70 on its contact surface which can be seen better in FIGS. 5 and 6. The bevel is chosen to properly orient the magnets 10 as they exit their keepers 32, 33. Each anvil 43 is approximately aligned with channel 50 so that as a pusher 42 is actuated, anvil 43 can enter the adjacent end of channel 50.

Magnet pushers 42 are actuated by compressed air supplied by hose 71 and controlled by a valve 72. Opening valve 72 causes cylinder-piston units 40 to drive anvils 43 toward each other simultaneously. A conventional spring in or double action capacity of the units 40 returns the anvils 43 to their retracted position shown in FIG. 4 when the valve 72 is closed.

Between the end of each anvil 43 when it is in its retracted position as shown in FIG. 4 there is a space in which a keeper 32 or 33 may be temporarily placed on a rest with its slot aligned with the adjacent retracted anvil 43. The height of each anvil 43 is less than the width of the slot 30 (dimension X in FIG. 3), so that an anvil 43 may enter its adjacent slot 30 when the pusher 42 is actuated. The rests supporting keepers 32, 33 may be simply surfaces of bed 49.

Between the keepers 32, 33 (when inserted on their respective rests on base 49) and on base 49 there is arranged a bed 73 on which there is a channel, generally 50, whose bottom or floor 61 may be defined by the upper surface of bed 73. It is probably helpful to refer to FIG. 5 from time to time during this explanation to better visualize the arrangement of the channel 50 on bed 73. The floor of channel 50 is accurately aligned with and adjacent to the lower surface of each keeper's slot 30. The purpose of this is to provide a continuous path for a magnet 10 carried in a keeper 32 or 33 into channel 50. The edges of bed 73 also serves to prevent the keepers 32, 33 from being moved by magnet pushers 42 when they are actuated.

One side of channel 50 is defined by edge 54 of a rear guide block 57; the other is defined by edge 55 of front guide block 59. Guide blocks 57 and 59 may be integral with bed 73, or may be removable and held in place on bed 73 by pins or machine screws, not shown. It is preferred that edge 55 of front guide block 59 have a slight central depression or relief 60 which has the effect of widening channel 50 slightly in its central length. The relief 60 is of an amount which allows the magnets 10 as they approach their positions to rotate slightly into the preferred angular positions.

There is in the floor 61 of channel 50, midway from its ends, a recess 62 whose shape corresponds to that of the pole piece 20 such that the pole piece is held without the possibility of it translating or rotating in the plane of the floor 61, and yet allowing the pole piece to be easily inserted and removed from this recess 62. The bottom of the recess supports the pole piece so that the surface of the pole piece 20 to which the magnets 10 are to be fastened when in the recess 62, is approximately flush with or slightly below the floor 61 of the channel 50. The bottom of recess 62 may simply be a part of the upper surface of base 49. The bed 73 may be lifted by a lifter mechanism, generally 41 in FIG. 4, which presses upwards on the bottom surface of bed 73 to make access to the magnet assembly easy. An alternative to this is to remove the magnet assembly from the top of the recess 62. Another alternative is to make the entire bottom of the recess 62 removable, so that the magnet assembly may be removed through the bottom of bed 73.

Figure 6:
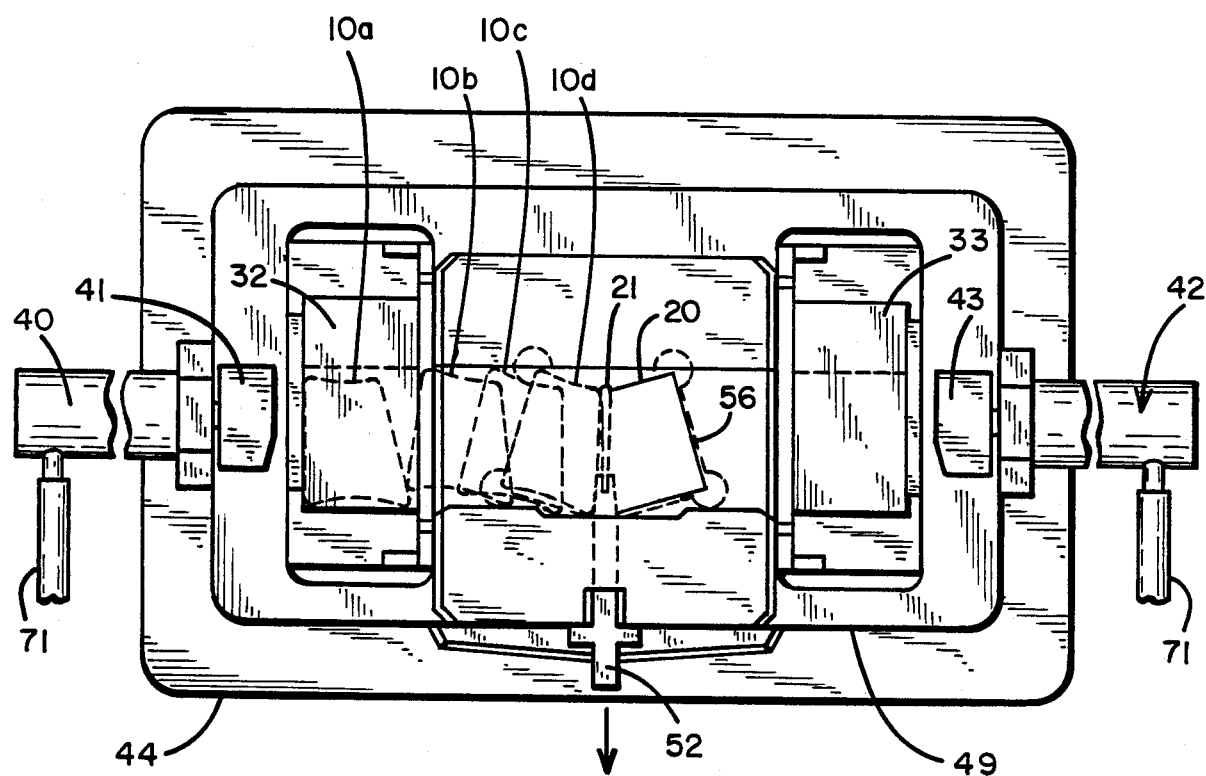
FIG. 6 is a plan drawing of the bed depicted in FIG. 5, and shows the approximate orientation of a magnet at several intermediate stages while it is moving to its proper position on the pole piece.
Figure 5:
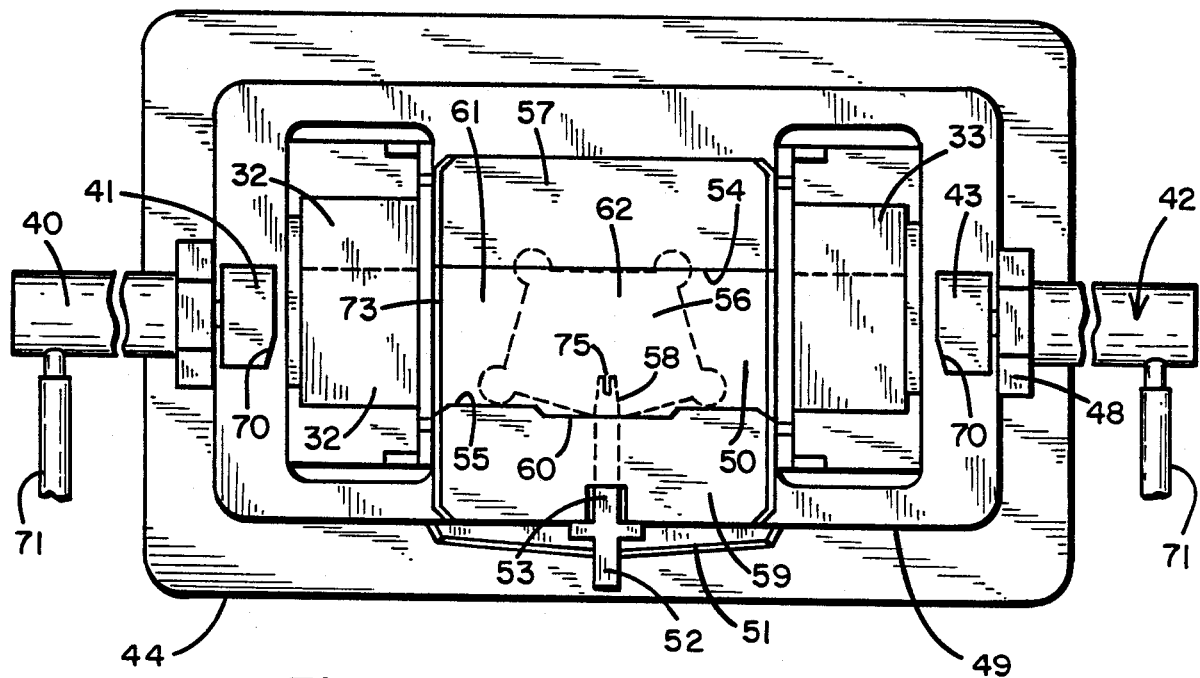
FIG. 5 is a plan drawing of the bed of the apparatus of Fig. 4 in which the positioning of the magnets on a pole piece occurs.

A magnet stop member 52 is located in the front guide block 59, and is adapted to slide from a first position, shown in FIGS. 4, 5, and 6, to a retracted position where its tip 58 is almost completely withdrawn from the channel 50. The magnets 10 are then free to attract themselves to a position as close to each other as the non-magnetic spacer 21 will allow. Magnet stop member 52 is normally held with tip 58 protruding into channel 50 by spring 51, spring 51 having a relatively low deflection force allowing tip 58 to be withdrawn easily from channel 50. Tip 58 has a slot 75 aligned with the centerline of stop 52 to accomodate the end of spacer 21.

Stop member 52 is shown in greater detail in FIG. 7. It is preferrably made of Nylon (reg. trademark) or some other low friction non-magnetic material. Stop member 52 has a cross piece 76 which allows tip 58 to protrude only a preselected amount into channel 50, thereby only partially closing it. Spring 51 fits into slot 77 to thereby transmit its force to member 52 and urge its tip 58 fully into its preferred position in channel 50.

It is also preferable that the tip 58 have a bevel on each side facing generally toward one end of channel 50 so that the bevels on tip 58 will be the contact points for magnets 10 on stop member 52 as they near the end of their range of motion. If the bevel angle is chosen correctly for the material from which the magnet stop 52, front guide block 74, and magnets 10 are made, as well as the weight and strength of the magnets 10, and the deflection force of spring 51 is only a few ounces, the force of the magnets' mutual attraction pressing magnets 10 against the bevels will create a camming force on stop member 52 causing it to automatically retract and position the magnets 10 on pole piece 20 in their predetermined spatial relationship. At the same time, the camming creates a smooth deceleration of the magnets 10 preventing damaging impact between the magnets. For a guide block 59 and magnet stop 52 both made of Nylon with smoothly finished rubbing surfaces and magnets 10 as described in conjunction with FIG. 1, a bevel angle of 8-9 degrees from the magnet stop's centerline will assure that magnet stop 52 will retract automatically from channel 50 when magnets 10 strike the bevels on its tip 58. All this occurs without any damage to the magnets 10.

To assure that the magnets track accurately in the channel 50, I prefer to close the mouth of channel 50 with a cover 45 which may merely rest on the guide blocks 57 and 59 with locating pins (not shown) preventing its lateral movement during use. Cover 45 can be thus easily removed to allow insertion of each pole piece 20.

One uses this apparatus to form a magnet assembly by initially placing a pole piece 20 in recess 56, and placing the cover 45 in the position shown in FIG. 4. Two magnet keepers 32, 33 are prepared with a magnetized magnet 10 positioned in each with its pair of corners 13 and 14 approximately aligned with the outside corners of slots 30 as shown in FIG. 3. The keepers 32, 33 are positioned in the apparatus as shown in Fig. 4 between the anvils 43 and the channel 50. Valve 72 is then opened and compressed air flows in tube 71 to cylinder-piston units 40, which causes the anvils 43 to press against the magnets 10 in their keepers 32, 33. The magnets are forced out of the keepers 32, 33 and into the channel 50 until they are sufficiently close to begin mutually attracting each other.

In FIG. 6, outline 10a of a magnet 10 shows a first intermediate position of a magnet as it slides in channel 50 toward magnet stop tip 58. Outlines 10b and 10c show further intermediate positions of a magnet 10 in the slot as it slides toward tip 58. Outline 10d shows a last intermediate position where magnet 10 has contacted tip 58 and stop 52 is about to start sliding in the direction of the adjacent arrow to allow maget 10 to reach its final position. It should be realized that a second magnet 10 is being simultaneously pushed from keeper 33 into channel 50 so that the two magnets slide simultaneously toward stop member 52. It is quite important that the magnets arrive at the stop 52 at nearly the same time to prevent damage to it. This can be accomplished by using cylinder-piston units 50 whose stroke velocities are identical. To accomplish this I prefer to use double-acting cylinders for which speed can be controlled with a flow control valve in each exhaust chamber outlet of cylinder-piston units 50.

The attractive force between the two magnets when both press against the adjacent bevels on tip 58 is sufficient to overcome the force of spring 51 and cam stop member 52 into its retracted position with its tip 58 withdrawn from channel 50. The natural resilience of spacer 21 and stop 52 and the relatively gradual deceleration of magnets 10 as they cam stop 52 from channel 50 serves to allow magnets 10 to reach their predetermined positions on pole piece 20 without the excessive impact between them which may cause them to be damaged.

The width of channel 50, i.e. the spacing between guide block edges 54 and 55 should be greater than the spacing between lines 15 and 16 in FIG. 1, but only slightly so, so that there is no possibility that a magnet 10 can rotate from approximately the desired angular orientation while sliding in channel 50. The magnets, under the influence of correctly spaced edges 54 and 55, properly shaped relief 60 and spacer 21, and properly designed stop member 52, and the magnets' mutual attraction, will consistently slide into their preferred orientation on pole piece 20.

Once the magnets 10 have reached their desired position, cover 45 can be removed and the lifter assembly 41 activated to allow access to the magnet assembly. At the same time, the pushers 42 are retracting anvils 43 so that the keepers 32, 33 in the apparatus can be replaced with others which have magnets in their slots 30. The lifter mechanism 41 is deactivated and a new pole piece placed in recess 62. The apparatus is then ready, with the replacement of cover 45, to position another pair of magnets 10 on the new pole piece.

There are a number of variations which the above invention can have, depending on the shape of the magnets and pole pieces to be assembled and the magnets' strength. I wish to cover all of these variations in the claims which follow.

I claim:

1. Apparatus for positioning on the surface of a ferrous pole piece in a predetermined spatial relationship, a pair of magnets of the type having relatively powerful flux generation which when the magnets are within a mutual attraction distance pulls them toward each other, each said magnet having two pairs of exterior corners, each pair of corners defining a line intersecting them, the two lines so defined being approximately parallel to each other with a predetermined spacing from each other, said apparatus comprising:

(a) a bed having on it a channel formed of a pair of opposed and facing interior walls and a floor between the walls, said walls spaced from each other a distance sufficiently close to each other to permit only a predetermined amount of rotation of a magnet within the channel, in which channel each magnet can slide with each pair of corners adjacent one interior wall, and a recess centrally located in the channel floor and adapted to receive the pole piece with the surface of the pole piece on which the magnets are to be positioned approximately flush with the channel floor, said recess oriented to position the pole piece to create the predetermined spatial relationship between each magnet and the pole piece as the magnets slide toward each other in the channel and over the pole piece;

(b) a magnet pusher at each end of the channel for simultaneously sliding magnets placed at the ends of the channel toward each other until magnetic attraction is felt between them and pulls them toward each other;

(c) a stop located in the channel above the pole piece recess and at least partially closing the channel, whereby, by placing the magnets in the ends of the channel and activating the pushers, the magnets are slid to within their mutual attraction distance and then under the force of mutual attraction slide further into contact with the stop and the pole piece, and by interaction between the magnets and the stop and channel walls, the magnets rotationally and translationally position themselves in the predetermined spatial relationship on the pole piece with the force of magnetic attraction between the magnets and the pole piece serving to maintain the magnets in the predetermined spatial relationship on the pole piece.

2. The apparatus of claim 1, wherein the stop is formed of a nonmagnetic material.

3. The apparatus of claim 1, wherein the magnet and pole piece assembly includes a non-maqnetic spacer in a preselected position between the magnets, and the stop includes a slot within which the space fits when the spacer is located in its preselected position on the pole piece.

4. The apparatus of claim 1, further comprising a cover enclosing the channel opening at the top, and removable therefrom.

5. The apparatus of claim 1, further including a ferrous magnet keeper having a surface to which the magnet may be attached, and a rest positioned between a magnet pusher and the adjacent channel end, said rest supporting the keeper with its magnet in aligned relation with both the channel and the pusher, whereby actuation of the pusher slides the magnet into the channel and further into said mutual attraction distance.

6. The apparatus of claim 5, wherein the magnet keeper comprises a rectangular prism having a groove in it from a first face to the face opposite and intersecting a face intersecting both the first face and its opposite, said groove having a width slightly greater than the magnet's thickness, and wherein the rest supporting the keeper includes means for supporting the keeper with the groove in alignment with and between a channel end and the adjacent pusher.

7. The apparatus of claim 1, wherein the stop comprises a member protruding into the channel above and approximately centered on the recess for the pole piece, so that the magnets when sliding toward each other under the force of mutual attraction will strike the end of the member within the channel when approximately in their preferred position respecting a pole piece in the recess.

8. The apparatus of claim 7, wherein the member is slidably mounted in the bed with an end which protrudes into the channel, said member end including a surface having a bevel facing generally toward a channel end, and wherein the stop further comprises a spring urging the member into the channel, whereby the force of the magnet when striking the member end will create a camming action on the member forcing its end out of the channel.

9. The apparatus of claim 1, wherein the magnet pusher includes an anvil for contacting and transmitting the force for sliding the magnet, said anvil including a bevel contacting the magnet for angularly orienting the magnet into a preferred angular position as it slides into the channel.

* * * * *